J. E. SIMMONDS.
AUTOMATICALLY CONTROLLED STOCK WATERING AND WATER HEATING AND SUPPLY TANK.
APPLICATION FILED DEC. 18, 1911.
1,164,880.
Patented Dec. 21, 1915.
4 SHEETS—SHEET 1.
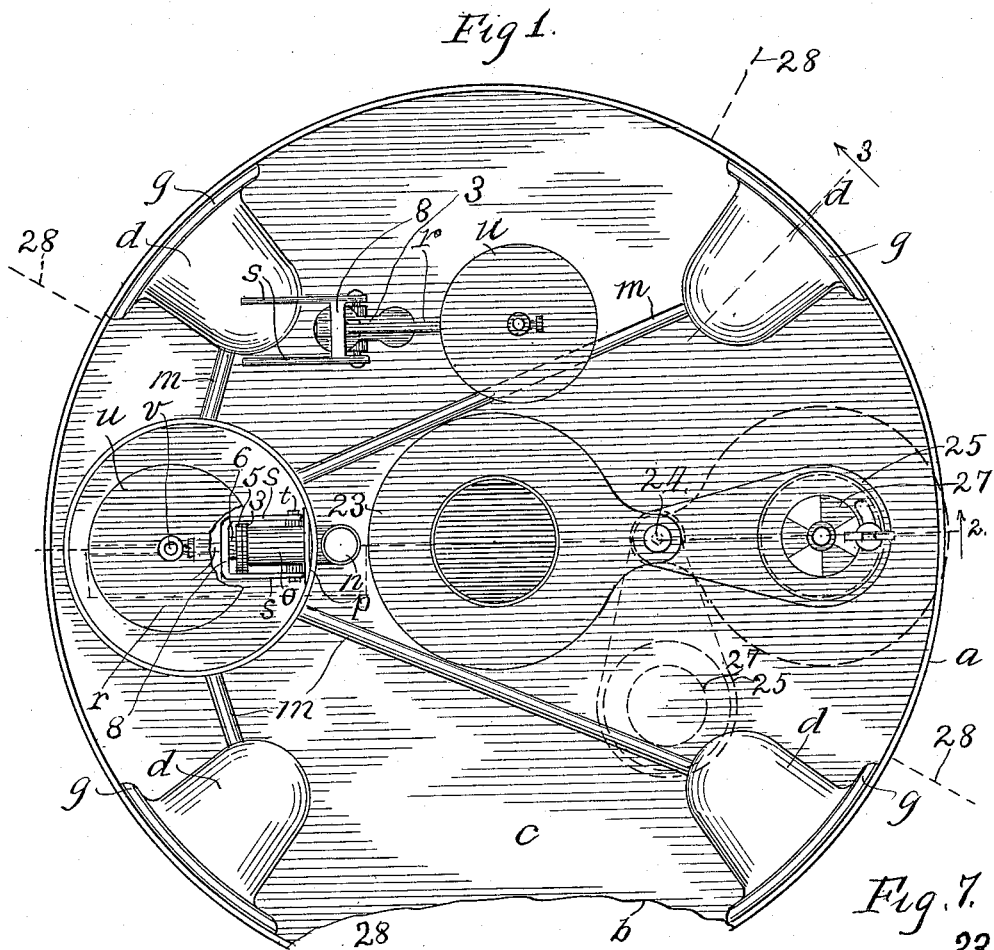
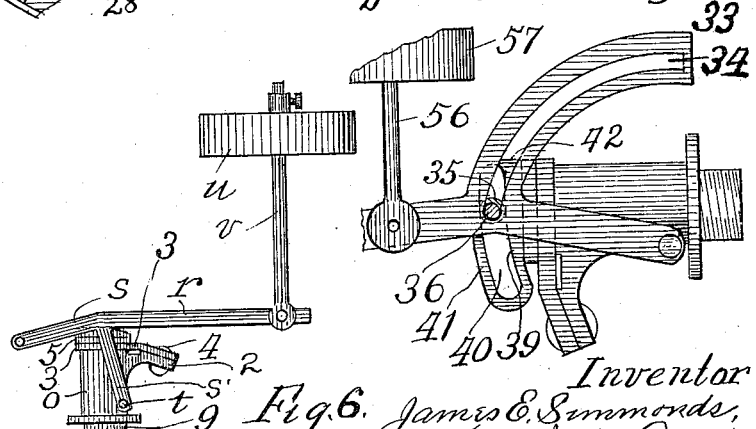

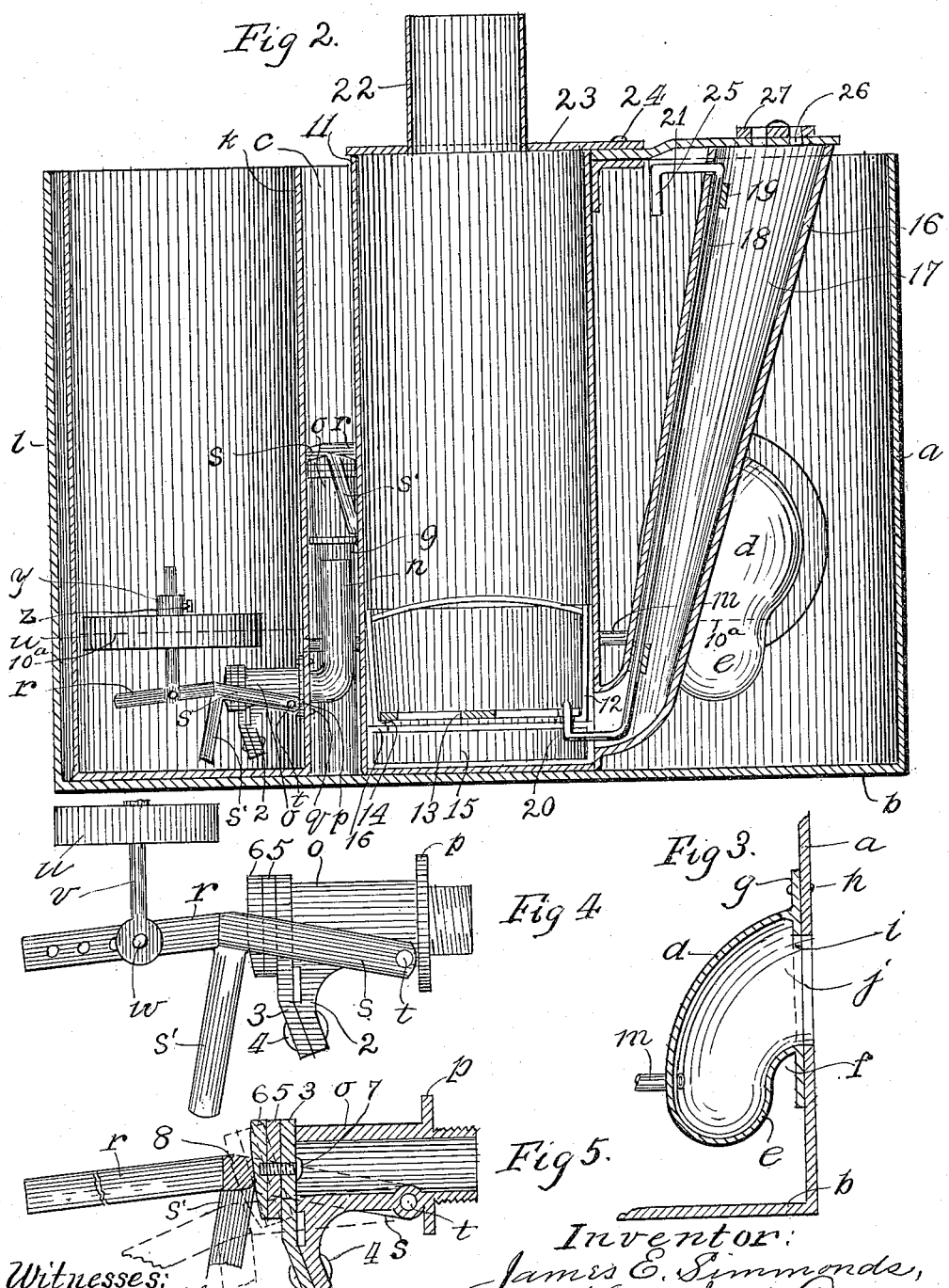

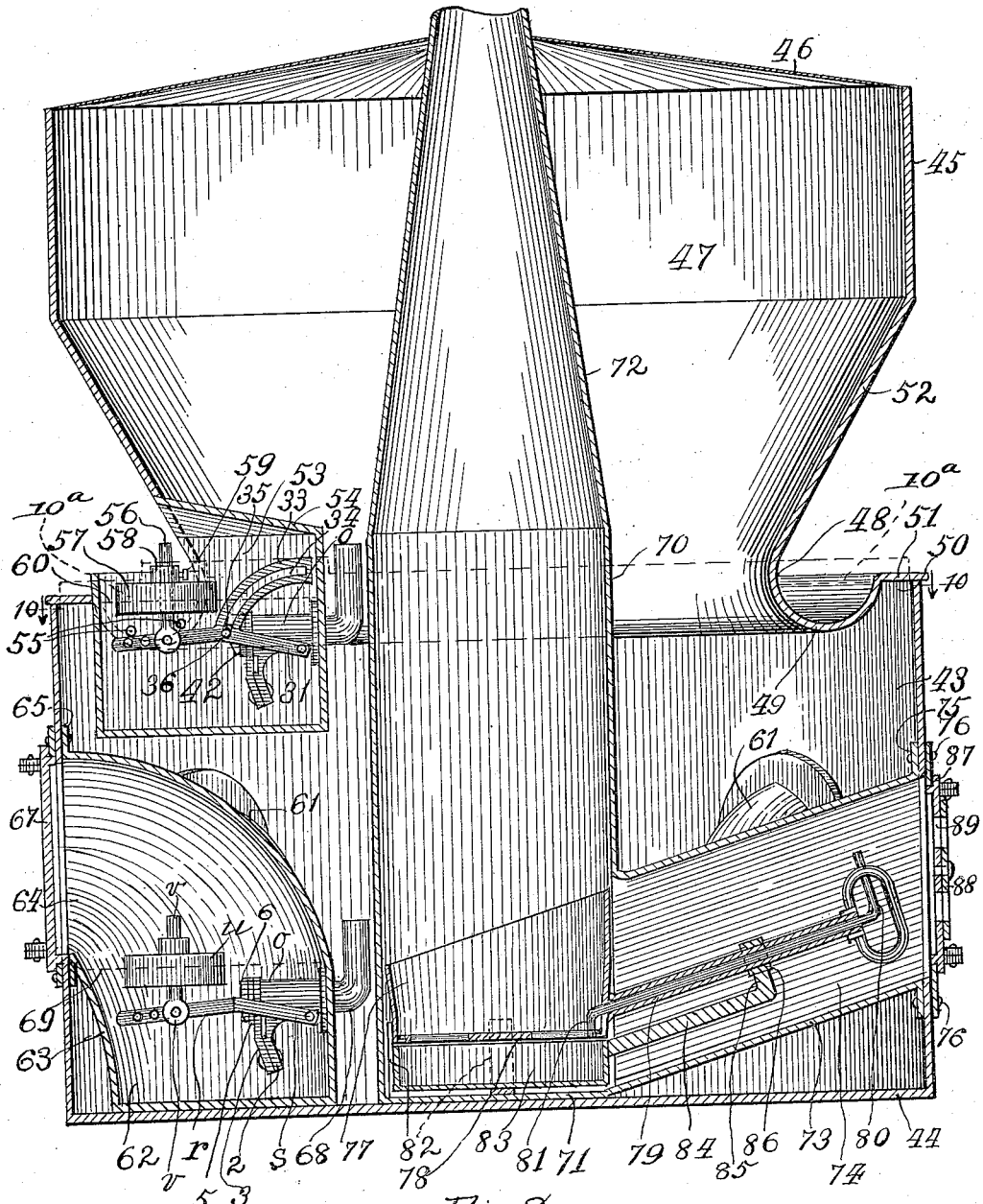

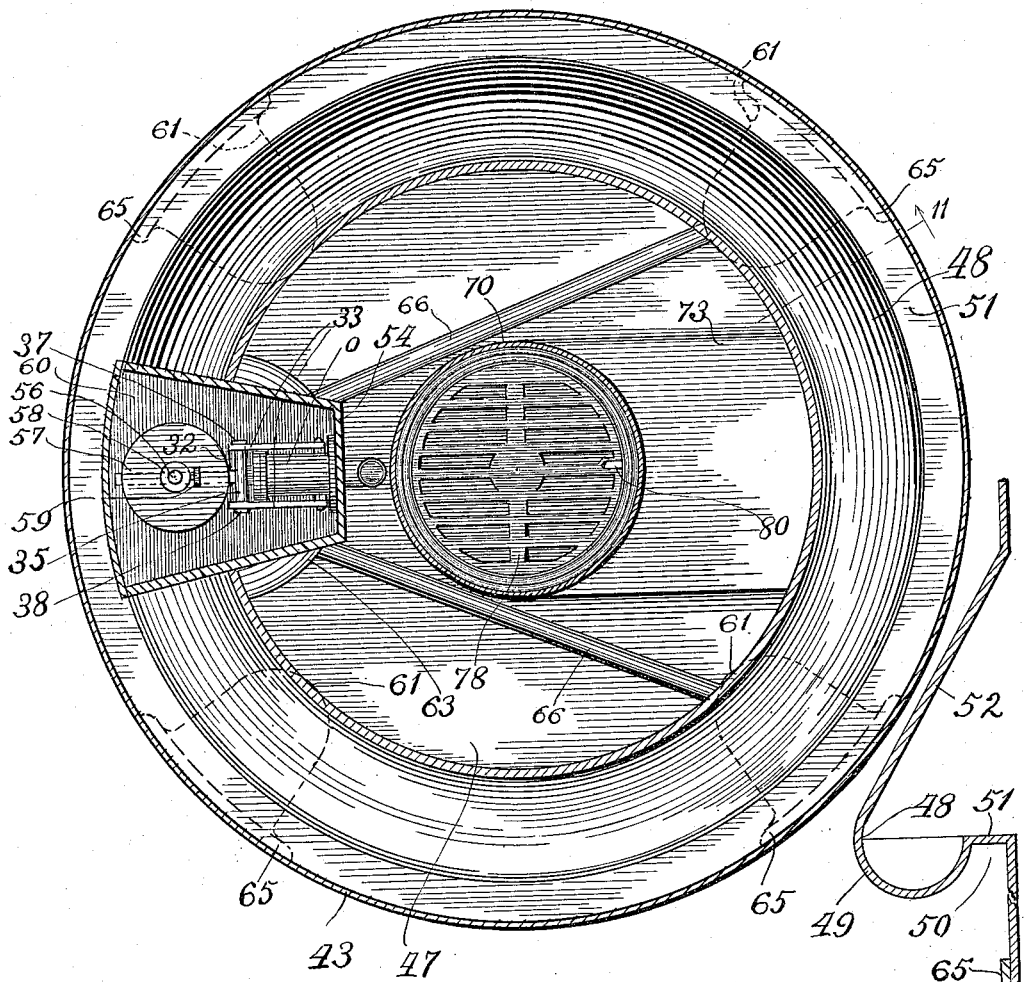

UNITED STATES PATENT OFFICE.

JAMES E. SIMMONDS, OF CAMP POINT, ILLINOIS.

AUTOMATICALLY-CONTROLLED STOCK-WATERING AND WATER HEATING AND SUPPLY TANK.

1,164,880.  Specification of Letters Patent.  Patented Dec. 21, 1915.

Application filed December 18, 1911. Serial No. 666,510.

*To all whom it may concern:*

Be it known that I, JAMES E. SIMMONDS, a citizen of the United States, residing in Camp Point, in the county of Adams and State of Illinois, have invented certain new and useful Improvements in Automatically-Controlled Stock - Watering and Water Heating and Supply Tanks, of which the following is a specification.

This invention relates to that class of stock watering and water heating tanks having a main reservoir and one or more water receptacles connected by a passage or passages and provided with means for controlling the flow of water from the main supply reservoir or chamber to such supplementary receptacles, and means for heating the water, and thereby keeping the supply unfrozen and available for stock watering and other purposes.

The principal object of the invention is to provide a simple, economical and efficient automatically controlled stock watering and water heating and supply tank.

A further object of the invention is to provide a stock watering and water heating tank having a main supply reservoir and one or more supplementary water receptacles connected with the main reservoir by means of a float chamber and passages, and surrounded by water contained in the main reservoir, or by a water-containing portion of the main reservoir, and means for heating the water contained in the main reservoir, and means for controlling the flow of water from the main reservoir to the relatively small supplementary receptacle or receptacles, whereby the desired quantity of water is maintained in the latter and prevented from freezing.

A further object of the invention is to provide means whereby the flow of water from the main reservoir to the supplementary receptacles or "stock drinks" may be controlled by float and valve mechanism in a single float chamber having passages communicating with the main reservoir and supplementary water receptacles respectively.

Other and further objects of the invention will appear from an examination of the drawings, which are made a part hereof, and the following description and claims.

The invention consists in the features, combinations, and details of construction herein described and claimed.

In the accompanying drawings, Figure 1 is a plan view of a stock watering and water heating and supply tank constructed in accordance with my improvements; Fig. 2, a view in vertical section through the center of the same, taken on line 2, of Fig. 1, looking in the direction of the arrow; Fig. 3, a detail view in vertical section, taken on line 3 of Fig. 1, looking in the direction of the arrow, and showing the construction and arrangement of one of the supplementary water receptacles, for watering small stock, such as hogs and sheep; Fig. 4, an enlarged detail view in side elevation of the valve mechanism for controlling the flow or supply of water; Fig. 5, a detail view in vertical longitudinal section, taken substantially through the center of the valve mechanism shown in Fig. 4; Fig. 6, a detail view of the float and valve mechanism shown in Figs. 1 and 2, for controlling the inlet to the main reservoir; Fig. 7, an enlarged detail view in side elevation of my improved valve and float mechanism shown in the upper float chamber in Figs. 8 and 9; Fig. 8, a view in central vertical section of a modified form of tank, showing a covered main reservoir provided with a circular trough or supplementary drinking receptacle for large stock, and showing valve and float mechanism for controlling the flow or level of water in different receptacles at different elevations; Fig. 9, a view in horizontal section taken on line 10 of Fig. 8 and showing the lower supplementary water or drinking receptacles for watering small stock, the heating mechanism, and upper valve mechanism and float chamber; and Fig. 10, a detail view in vertical section, taken on line 11 of Fig. 9, looking in the direction of the arrow, and showing the upper circular trough or receptacle and one of the lower receptacles.

In constructing a stock watering and water heating and supply tank, and heating and valve mechanism therefor, in accordance with my improvements, I provide a tank having a main body portion *a* and a bottom *b*, of suitable material, such as sheet metal, concrete, wood, or other suitable material, the main body comprising preferably circular side walls. The main body portion of the tank thus forms a main water supply chamber or reservoir *c*, and is provided with preferably a plurality of supplementary liquid receptacles or drinking vessels *d* each located inside of and encircled by the side walls of the main reservoir. These auxiliary chambers or drinking receptacles *d* are of such construction that each comprises a lower water-containing portion *e* located a sufficient distance from the adjacent side wall of the main reservoir to provide a space *f* between the water-containing portion of each receptacle *d* and such main reservoir wall to which the mouths of the receptacles are secured by means of annular flanges *g* and rivets *h*, or in a similar or other suitable manner. Each receptacle *d* has a neck portion *i* projecting laterally beyond the water-containing portion of the receptacle and of sufficient length to provide the space *f* above described, and the flanges *g* may form a part of this neck portion and encircle the mouths or side openings *j* of the receptacles *d* respectively, which mouths or side openings communicate with the exterior of the main reservoir, the side walls of which are provided with openings corresponding in position with the mouths *j* and through which the noses or heads of stock may be inserted when drinking from the receptacles. By this construction and arrangement each receptacle *d* is surrounded above and below and on all sides of its water-containing portion with water contained in the main reservoir, and only the side opening or mouth of each receptacle *d* is permitted to be without water on all sides thereof. The undue freezing of the relatively small quantities of water contained in the reservoirs *d* or drinking vessels, is thus prevented, and the desired temperature of the water contained in the supplementary receptacles is maintained by the water contained in the larger or main reservoir and by the same heating device which heats the latter.

Mounted in the main reservoir is a suitable casing portion *k* which may be secured to or form a part of the main body portion or main reservoir, and serves to form a float chamber *l* having outlet passages formed by pipes *m* communicating with the respective supplementary chambers, receptacles or drinking vessels *d* and forming connections between said receptacles and the float chamber. The float chamber is provided with an inlet opening or supply conduit formed by a pipe *n* which communicates with the interior of the main reservoir, said pipe being provided with an inner pipe or casing portion *o* secured to the casing of the float chamber by means of a flange *p*, and rivets *q*, or in any suitable manner. To the casing *o* is pivotally secured a valve operating lever *r*, provided with forked arms *s* located on opposite sides of the casing *o* and each pivotally connected with the latter near its outer end by means of a pivot *t*. This lever is adapted to swing upward and downward as indicated in Fig. 5, and is provided with a float *u* connected therewith by means of a connecting rod *v* pivoted at its lower end by means of a pivot *w*. The float is secured to the connecting rod by means of a collar *y* which encircles the rod and is secured to the latter in any desired adjusted position by means of a set screw *z*, or in any desired ordinary or known manner. Each valve casing *o* is provided with a projecting arm 2, and a valve formed of a piece of flexible material 3 and rigid members 5 and 6 is preferably secured to the arm 2 by means of screws or rivets 4. These metallic reinforcing or lever engaging portions 5 and 6 are secured to the leather valve member by means of a screw 7, or in any desired similar manner. The valve thus formed is located between the valve engaging portion 8 and the axis of the lever *r* and in such position that the raising of the lever by means of raising the float, will press the cross piece or valve-engaging member or portion 8 of the lever against the part 6 of the valve and close the valve. The lowering of the float *u* and lever *r* will permit the valve to open, as indicated in broken lines in Fig. 5. The valve and the lever *r* are so constructed and arranged that as the end of the lever which is connected with the float swings upward the valve will be pressed toward the mouth of the pipe or valve casing *o* to closed position across the opening or passage in the valve casing, the movement of the valve-engaging member or portion of the lever during the closing movement of the valve being preferably toward the swinging or free end of the valve. And the movement of the valve engaging portion of the lever, during the movement of the valve to open position is in the direction of the receding or tapered end of the boss or lever-engaging shoulder portion 6 of the valve, or that portion of the valve having the least movement, or in the direction of the connected portion of the valve when the latter is connected with the valve casing, as described. The lever is thus adapted to close and permit the opening of the valve with the minimum amount of friction between the lever and valve and the slightest change in the level of the liquid will cause a sufficient movement of the lever to permit the valve to open, or to press it to closed position against the valve seat which may be and is, by preference, an integral part of the valve casing. And the leverage afforded is such as to hold the valve snugly against its seat and in position to keep the passage securely closed.

By the construction and arrangement of the valve and float mechanism as herein described, the valve casing may be placed in either an upright or a horizontal position by simply disconnecting the forked arms *s* from the casing, and pivotally connecting the lever arms $s'$ to the casing when the latter is to be in upright position. In order to enable this to be accomplished in the simplest possible manner the arms $s'$ are provided and arranged at an angle with respect to the arms $s$, said arms $s$ and $s'$ forming an integral part of the valve operating lever, as shown in Figs. 1, 2, 4, 5, and 6—Figs. 1 and 6 showing an inlet pipe 9 for supplying water to the main reservoir, provided with a valve casing mounted in upright position, and Figs. 2, 4, and 5, showing the valve casing $o$ in horizontal position.

By the above arrangement of the valve, valve operating lever, and valve casing whereby the valve is intermediate the valve engaging member of the lever and the axis or point of pivotal connection of the lever with the casing, the valve and float mechanism is adapted to occupy the minimum or smallest possible space consistent with efficiency in operation, and a very slight movement of the lever will suffice to close or permit the opening of the valve.

In order to provide a valve and float mechanism, or valve and valve operating mechanism adapted to be used either as an inlet valve or outlet valve and adapted to enable the valve casing to be mounted either in upright, or horizontal position, or at any desired incline, with the valve operating lever, or lever and float in operative position I provide a valve operating lever 30 having forked arms 31 connected with the main body portion or arm of the lever by means of a cross piece 32, as shown in Figs. 7 and 9 and in the upper part of Fig. 8, all substantially identical with the lever $r$, arms $s$ and cross piece or valve engaging member 8 already described. And this lever 30 is provided with a pair of segments 33 converging and preferably integral with the arms 31 and the cross piece 32 and extending upward preferably in the form of an arc of a circle, the center of which is at the pivotal center or axis of the lever. Each of these segments is provided with a segmental slot 34 also in the form of an arc of a circle the center of which is at the axial center or axis of the lever. Arranged transversely of the lever and between these slotted segments is a valve engaging member 35 which is preferably in the form of a tube or sleeve through which extends a bolt 36 the opposite ends of which extend through the slots 34 and are secured to the segments 33 by means of a head 37 on one end of the bolt and a nut 38 on the opposite end thereof. The ends of the sleeve 35 are each in engagement with the inner side of a segment 33, and the sleeve is thus adapted to be adjusted to any desired position between the opposite ends of the slotted segments, according to the angle at which the casing is to be mounted, and securely held in such adjusted position by means of the bolt. (See Fig. 7.) The sleeve 35 and its bolt, are rigidly held in fixed relation to the segments 33, and is adapted to engage the adjacent surface of the valve member or tapered lever-engaging boss or shoulder 39. The valve member 39 may be provided with a segmental or inclined slot 40 through which the bolt 36 and sleeve 35 may extend. By this arrangement the sleeve 35 is adapted to engage the outer segmental portion 41 of the lever-engaging valve member which forms the outer wall of the slot 40 and thus provide means for positively moving the valve 42 shown in Fig. 7, to open position—the valve being positively moved to closed position by means of the float and lever. The lever shown in Fig. 7, with its segments, may be detached from the casing and reversed and replaced in reversed position, when the valve casing is to be inclined downward or in such a position that the valved end of the casing is lower than the flanged or pipe engaging end thereof. The float and lever will thus operate the valve in any position.

The water level in the float chamber and in the auxiliary receptacles is indicated by the broken line $10^a$, and it will be readily seen that the upward and downward movement of the float will operate the valve in the float chamber and control the level of the water in all of the auxiliary or drinking vessels.

In order to provide means whereby the water in all of the supplementary receptacles or drinking vessels and that in the main reservoir may be heated by the same heating device, a fire pot 11 is provided, the walls of which extend inside of the main reservoir from a point below the level of the water contained in the latter to a point above the level of the water. An inner fire box or fuel containing vessel 12 is arranged on the inside of the main body portion or casing of the fire pot 11, and provided with a movable grate 13, said inner fire box 12 having a bottom flange 14 upon which the grate rests, and having an ash pan 15, provided with a flange 16 on which the inner fire box rests. The inner fire box and ash pan may thus be removed and replaced together.

The main body portion or casing 11 of the fire pot is provided with a hollow projecting casing portion 16, forming a passage 17 through which a rock shaft 18 extends. This rock shaft is rockingly mounted in suitable bearings 19, and has its lower end portion at an angle to its main body portion and in engagement with the grate. The upper or outer end of the rock shaft is provided with a handle 21 by means of which the shaft may be rocked, and thereby shake the grate. The passage 17 also serves to form a flue through which air is drawn toward the fire, when the device is in operation. A main flue or chimney 22 is mounted on the cover 23 of the main casing portion of the fire pot, the cover being pivotally secured to the casing by means of a pivot 24 located between the main body portion of the casing and the upper end of the air inlet passage 17, as shown in Fig. 2. A damper 25 is pivoted on the same pivot 24, and extends over the mouth of the passage 17, and is provided with openings 26, and a reciprocating shutter portion 27 for opening and closing the same. This damper is in the same plane with the cover 23 already described, and is adapted to be moved from its normal position shown in full lines in Fig. 1 to open position, shown in broken lines in said figure, by the movement of the cover 23 from the position shown in full lines in Fig. 1, to the position indicated in broken lines in said figure. When the cover and damper are in the position indicated in broken lines in said figure, the top of the fire pot is open and the main flue 22 is directly over and in communication with the passage 17, thus causing the draft to be downward in the main body portion of the fire pot 11 and upward through the passage or flue 17. This enables the operator to remove or inspect the fire, or to replenish it— the smoke being thus drawn upward through the passage 17. When the cover and damper are in the position shown in full lines in Figs. 1 and 2, the draft is upward through the main casing 11 of the fire pot, and downward through the passage 17.

The lines 28 in Fig. 1 indicate the location of fences, and show that the drinking vessels may open into separate lots. The stock in separate lots may thus be supplied with water and enabled to drink from the same tank, all of the water being heated by the same heating device or fire.

In Figs. 8 and 9 is shown a tank of modified form having a lower main body portion 43 and bottom 44 similar to that shown in Figs. 1 and 2, and already described, and provided with an upper body portion having side walls 45 and a cover 46 forming a covered main reservoir 47. A circular trough or upper supplementary drinking receptacle 48 is located inside of the side walls of the lower main body portion of the tank in such position that the lower liquid-containing portion 49 of said receptacle 48 is a sufficient distance from the adjacent side walls of the main reservoir to provide a space 50 covered by a casing portion 51, so that the liquid-containing portion of the circular receptacle 49 is entirely surrounded by water contained in the main reservoir. The inner wall of the supplementary receptacle or circular trough has an upwardly and outwardly extending annular portion 52 forming the lower tapered portion of the upper main body portion of the tank, or in other words, forming a recess in the side walls of the tank above the annular trough or receptacle for admitting the heads of animals when drinking from the trough or annular receptacle.

An upper float chamber 53 is formed by an inner casing or upper float tank 54, the walls of which float tank are provided with outlet openings 55 which communicate with the annular trough or supplementary receptacle 48. In this float chamber is arranged a float and valve mechanism comprising a valve casing $o$, valve operating lever 30, with forked arms 31, slotted segments 33 and a valve engaging member in the form of a sleeve 35 adjustably secured in rigid relation to and between the slotted segments by a headed bolt 36 and nut 38, constructed as shown in Figs. 7, 8, and 9, and as already described in connection with Fig. 7. To the lever 30 is secured a float rod 56 to which is secured a float 57, secured in operative position by means of a collar 58 on the rod 56, and a set screw 59 for holding the collar in any desired position on the rod to which it is adjusted. The collar thus limits the upward movement of the float with respect to the rod, and the float may be slidably mounted on the rod between the collar and valve operating lever if desired provided the lever and rod are sufficiently heavy to operate the lever and thereby the valve by gravity. The float may be rigidly secured to the rod when desired, by simply making the collar 58 integral with the float or securing it in fixed relation thereto. The level of the water in the upper float chamber 53 and in the receptacle 48 is indicated by the broken line 60 in Fig. 8.

The lower portion of the tank shown in Figs. 8 and 9 is provided with a series of supplementary drinking receptacles 61 shown in Fig. 9, which are preferably identical in form and construction and arrangement with the receptacles $d$ already described. Said tank is also provided with a lower float chamber 62 formed by an inner casing 63 having a side opening or mouth 64 which communicates with the exterior of the main tank, the mouth being secured to the side wall of the tank by means of an annular flange 65 which encircles the mouth of the casing 63 on the inside of the wall of the main tank or reservoir, as shown in Fig. 8. This float chamber is therefore a modified form of float chamber but similar to the float chamber $i$ and float tank $k$ shown in Fig. 2, and already described, and is connected with the respective lower supplementary liquid receptacles or drinking vessels 61 by means of pipes 66 each of which communicates with the float chamber 62 and a supplementary receptacle 61. The mouth of float chamber 62 is provided with a door 67 which may be of any desired form, and said float chamber is provided with float and valve mechanism which is preferably identical with the float and valve mechanism shown in Figs. 2, 4, and 5, with the single exception that the forked lever arms $s'$ of the lever $r$, shown in Figs. 2, 4, 5, and 6, are omitted. This float and valve mechanism therefore comprises a lever $r$ having forked arms $s$ pivotally secured to the valve casing $o$, and a valve comprising valve members 3, 5 and 6 secured to the projection 2 of the valve casing, all constructed and arranged substantially as above described with respect to the valve mechanism in the float chamber $l$. And the lever $r$ is connected with a float $u$ by means of a connecting rod $v$ identical with the float and rod shown in float chamber $l$ in Fig. 2. The float chamber 62 is provided with an inlet or supply pipe 68 which communicates with said float chamber and with the main reservoir 47, and the inner end of which pipe is connected with the valve casing $o$ in said chamber 62. The level of the water in the float chamber 62 and in the lower supplementary drinking receptacles 61 is indicated by the broken line 69, and is controlled by the single float and valve mechanism in the chamber 62.

The fire pot for the tank shown in Figs. 8 and 9 comprises a main fire pot casing having side walls 70 and a bottom 71, and provided with a flue 72 extending upward through the cover of the tank. The main body portion of this casing or fire pot is provided with a laterally and upwardly projecting hollow casing portion 73 forming a passage 74 which communicates with the lower portion of the fire pot and with the exterior of the main tank to which the outer end of said hollow projecting portion is secured by means of an encircling inner flange 75 secured to the side walls of the tank by means of rivets 76, or any desired suitable manner. A removable inner fire box 77 having a grate 78 forming a grated bottom therefor is placed in the lower portion of the main fire pot casing, and is provided with a handle 79, preferably hollow or tubular in form, and is provided with a shaker rod 80 which extends loosely through and longitudinally of the handle, with the inner end 81 bent at an angle to the main body of the rod and in engagement with the grate, for shaking the ashes through the latter. The bottom of the removable fire box 77 is provided with a frame portion formed of metallic strips 82 shown in Fig. 9, and extending beneath the bottom of an ash pan 83 located beneath the grate 78 and provided with a handle 84 connected with the handle 79 of the fire box by means of a neck 85 provided with a collar 86 through which the handle 79 of the inner fire box extends. The projecting portion 73 of the fire pot casing is provided at its outer end with a door 87 having a damper 88 provided with openings 89 for admitting and controlling the volume of air admitted to the interior of the fire pot. By this arrangement the water contained in the main reservoir, and the water contained in the upper annular trough or supplementary receptacle, and also the water contained in the lower supplementary or drinking receptacles is heated by the same heating device and kept from freezing in the relatively small receptacles by having the liquid-containing portions of the latter all entirely surrounded by water contained in the main reservoir.

I claim:

1. A tank comprising in its construction a main body portion provided with a main reservoir having side walls, a supplementary receptacle located inside of the walls of the main reservoir and having an opening communicating with the outside of the latter, said supplementary receptacle being of such construction as to provide a space between its lower portion and the adjacent side wall of the main reservoir, for containing liquid, a float chamber provided with a passage communicating with said supplementary receptacle and having an inlet passage communicating with the main reservoir, and float and valve mechanism for opening and closing said inlet passage of the float chamber.

2. In an apparatus of the class described, a tank comprising in its construction a main reservoir having side walls, a supplementary receptacle located inside of the walls of the main reservoir and having an opening communicating with the outside of the latter, and provided with a space between the lower portion of said supplementary receptacle and the adjacent side wall of the main reservoir, for containing liquid, a float chamber provided with a passage communicating with said supplementary receptacle and having an inlet passage communicating with the main reservoir, means for opening and closing said inlet passage of the float chamber, and a fuel receptacle for heating the interior of the tank.

3. In an apparatus of the class described, the combination of a tank comprising in its construction a main reservoir having side walls, a plurality of supplementary receptacles located inside of the walls of the main reservoir and each having an opening communicating with the outside of the latter, and provided with a space between the lower portion of each of said supplementary chambers and the adjacent side wall of the main reservoir, for containing liquid, a float chamber provided with passages communicating with such supplementary receptacles and having an inlet passage communicating with the main reservoir, and float and valve mechanism for controlling the flow of liquid through said inlet passage of the float chamber.

4. In an apparatus of the class described, the combination of a tank comprising in its construction a main reservoir having side walls, a plurality of supplementary receptacles located inside of the walls of the main reservoir and each having a side opening communicating with the outside of the latter, each of said supplementary receptacles comprising in its construction a covered main body portion and a lower liquid-containing portion adapted to be entirely immersed in liquid contained in said main reservoir above and below said opening, a float chamber provided with a passage communicating with said supplementary receptacles and having an inlet passage communicating with the main reservoir, and float and valve mechanism for controlling the flow of liquid through said inlet passage of the float chamber.

5. In an apparatus of the class described, the combination of a tank comprising in its construction a main reservoir having side walls, a plurality of supplementary receptacles located inside of the walls of the main reservoir and each having an opening communicating with the outside of the latter, each of said supplementary receptacles comprising in its construction a lower liquid-containing portion adapted to be entirely surrounded by liquid contained in the main reservoir and having an inlet passage leading into such supplementary receptacle, float and valve mechanism for opening and closing said inlet passage of the float chamber, and means for heating the interior of the tank.

6. In an apparatus of the class described, the combination of a tank comprising in its construction a main reservoir having side walls, a series of supplementary receptacles located inside of the walls of the main reservoir and each having a side opening communicating with the outside of the latter, and having a lower liquid-containing portion provided on all sides with a space between it and the side walls of the main reservoir, for containing liquid, a float chamber provided with a passage communicating with such supplementary receptacles and having an inlet passage communicating with the main reservoir, and float and valve mechanism for opening and closing said inlet passage of the float chamber.

7. In an apparatus of the class described, a tank comprising in its construction a main reservoir having side walls, a liquid receptacle having a lower liquid-containing portion provided on all sides with a space between it and the side walls of the main reservoir and within the latter for containing liquid, a float chamber provided with a passage communicating with such encircled liquid receptacle and having an inlet passage communicating with the main reservoir, a valve for said inlet passage of the float chamber, and a float located in said float chamber and connected with said valve.

8. In an apparatus of the class described, the combination of a tank comprising in its construction a main reservoir having side walls, a relatively small liquid receptacle having a lower liquid-containing portion surrounded on all sides with a liquid-containing space between it and the walls of the main reservoir and within the latter, a float chamber provided with a passage communicating with such relatively small liquid receptacle and having an inlet passage communicating with the main reservoir, valve and float mechanism for opening and closing said inlet passage of the float chamber, and a fuel receptacle for heating the interior of the tank and the liquid contained in the main reservoir and relatively small liquid receptacle.

9. In an apparatus of the class described, the combination of a tank comprising in its construction a main reservoir having side walls, a supplementary liquid receptacle having a lower liquid-containing portion within the side walls of the main reservoir and adapted to be surrounded on all sides with liquid contained in the main reservoir, a float chamber provided with a passage communicating with such supplementary receptacle and having an inlet passage communicating with the main reservoir, a valve for said inlet passage of the float chamber, a float connected with said valve, and a fuel receptacle extending inside of the main reservoir.

JAMES E. SIMMONDS.

Witnesses:
HARRY IRWIN CROMER,
JENNIE L. FISKE.

Copies of this patent may be obtained for five cents each, by addressing the "Commissioner of Patents, Washington, D. C."